US006885708B2

(12) United States Patent
Thomas et al.

(10) Patent No.: US 6,885,708 B2
(45) Date of Patent: Apr. 26, 2005

(54) TRAINING PREFIX MODULATION METHOD AND RECEIVER

(75) Inventors: Timothy A. Thomas, Palatine, IL (US); Vijay Nangia, Schaumburg, IL (US); Kevin L. Baum, Rolling Meadows, IL (US); Frederick W. Vook, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 105 days.

(21) Appl. No.: 10/198,487

(22) Filed: Jul. 18, 2002

(65) Prior Publication Data

US 2004/0013084 A1 Jan. 22, 2004

(51) Int. Cl.[7] ............................................. H04L 27/28
(52) U.S. Cl. ..................................... 375/260; 370/208
(58) Field of Search .................................. 370/203, 204, 370/208, 210; 375/260, 231, 295, 346, 348, 350; 342/372, 378, 368, 383

(56) References Cited

U.S. PATENT DOCUMENTS

| | | | | |
|---|---|---|---|---|
| 5,953,311 A | * | 9/1999 | Davies et al. ................ | 370/210 |
| 6,014,412 A | * | 1/2000 | Wiese et al. ................. | 375/346 |
| 6,185,251 B1 | * | 2/2001 | Fertner ........................ | 375/231 |
| 6,289,045 B1 | * | 9/2001 | Hasegawa et al. .......... | 375/231 |
| 6,369,758 B1 | * | 4/2002 | Zhang ......................... | 342/383 |
| 6,580,761 B1 | * | 6/2003 | Laroia et al. ................ | 375/260 |

OTHER PUBLICATIONS

John A. C. Bingham, "*Multicarrier Modulation for Data Transmission: An Idea Whose Time Has Come,*" IEEE Communications Magazine, May 1990, pp 5–14.

Hikmet Sari, Georges Karam, and Isabelle Jeanclaude, "*Transmission Techniques for Digital Terrestrial TV Broadcasting,*" IEEE Communications Magazine, Feb. 1995, pp. 100–109.

Timothy A. Thomas, Frederick W. Vook, "*Multi–User Frequency–Domain Channel Identification, Interference Suppression, and Equalization for Time–Varying Broadband Wireless Communications,*"Motorola Labs–Communication Systems Research Laboratory.

Luc Deneire, "*Training Sequence versus Cyclic Prefix—A New Look on Single Carrier Communication,*"IEEE Communications Letters, Vol. 5, No. 7, Jul. 2001, pp. 292–294.

* cited by examiner

*Primary Examiner*—Don N. Vo

(57) ABSTRACT

A receiver for implementing a training prefix modulation method in response to a reception of a signal propagating through a channel is disclosed. The signal as received includes training blocks with each training block having a data inter-block-interference therein, and data blocks with each data block having a training inter-block-interference therein. The signal is selectively reconstructed to provide a circular appearance of the channel over the data blocks. Specifically, an estimate of the training inter-block-interferences is generated and subtracted from the data blocks. And, an estimate of the data inter-block interferences is generated and added to the data blocks.

35 Claims, 5 Drawing Sheets

*—PRIOR ART—*

TRAINING PREFIX MODULATION METHOD AND RECEIVER

FIELD OF THE INVENTION

The present invention generally relates to the field of communication systems. More specifically, the invention relates to communication systems implementing frequency-domain-oriented modulation methods ("FDMM") (e.g., orthogonal frequency division multiplexing ("OFDM"), spread OFDM ("SOFDM") or multi-carrier code division multiple access ("MC-CDMA"), single carrier with cyclic prefix ("CP-SC"), cyclic prefix code division multiple access ("CP-CDMA"), and interleaved frequency division multiple access ("IFDMA")).

BACKGROUND OF THE INVENTION

Single carrier with cyclic prefix ("CP-SC") insertion is a signal format known in the art for facilitating frequency-domain equalization. This is due to the cyclic prefix insertion causing the convolution of the CP-SC signal with a multipath channel to appear circular at the receiver (this can also be said to restore orthogonality between the frequency domain bins or subcarriers of a frequency domain representation of the signal). This circular appearance of the channel (also known as a circular channel) enables the use of low complexity frequency-domain equalization of the single carrier signal. However, a disadvantage of conventional CP-SC is that the receiver discards the received cyclic prefix prior to detection, resulting in a waste of the energy relating to the cyclic prefixes.

Training prefix single carrier is a means to recover the lost energy relating to the cyclic prefixes. Training prefix single carrier replaces the traditional cyclic prefixes with a block of known symbols known as the training prefix (i.e., each block of data symbols has a training prefix sent before and after it, where the one after it is actually a prefix for a following data block). Also, the training prefix is the same for each block of data symbols. These training symbols may be used to estimate the channel or improve the tracking in time of the channel. However, prior art methods for recovering the data symbols may be inefficient due to the need of taking a larger fast fourier transform ("FFT") that encompasses the training prefixes. Finally, prior art methods will not work when the training prefix before a block of data symbols is different than the training prefix after the block of data symbols.

Therefore, it is desirable to receive the advantages of the training prefix single carrier signal while maintaining the circular channel property of conventional CP-SC. It would also be beneficial to develop techniques that can be used with multi-carrier systems such as OFDM.

SUMMARY OF THE INVENTION

One form of the invention is a method for reconstructing a signal including a data block having a first inter-block-interference and a training block having a second inter-block-interference. The data block is reconstructed to exclude the first inter-block-interference and to include the second inter-block-interference.

A second form of the invention is another method for reconstructing a signal including a data block having a first inter-block-interference and a training block having a second inter-block-interference. At the receiver, the training block is replaced with a null block, and the null block is constructed to include the second inter-block-interference. Additionally, the data block can be reconstructed to exclude the first inter-block interference.

A third form of the invention is a method for processing a signal propagating through a channel. The signal includes a data block and a training block with the data block including information and a first inter-block-interference, and the training block including a second inter-block-interference. Upon a reception of the signal, one or more reconstructions of the data block to exclude the first inter-block-interference and to include the second inter-block-interference are selectively executed. Third, the reconstructed data block can then be processed further to recover information in the data block.

A fourth form of the invention is a method for creating a multicarrier signal block with a training extension, which can be transmitted over a channel and used by a receiver in accordance with one of the other forms of the invention.

The foregoing forms as well as other forms, features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

The invention relates to communication systems implementing frequency-domain-oriented modulation methods ("FDMM") (e.g., orthogonal frequency division multiplexing ("OFDM"), spread OFDM ("SOFDM") or multi-carrier code division multiple access ("MC-CDMA") or code division multiplexed OFDM (CDOFDM), single carrier with cyclic prefix ("CP-SC"), cyclic prefix code division multiple access ("CP-CDMA"), and interleaved frequency division multiple access ("IFDMA")).

Figure 1:
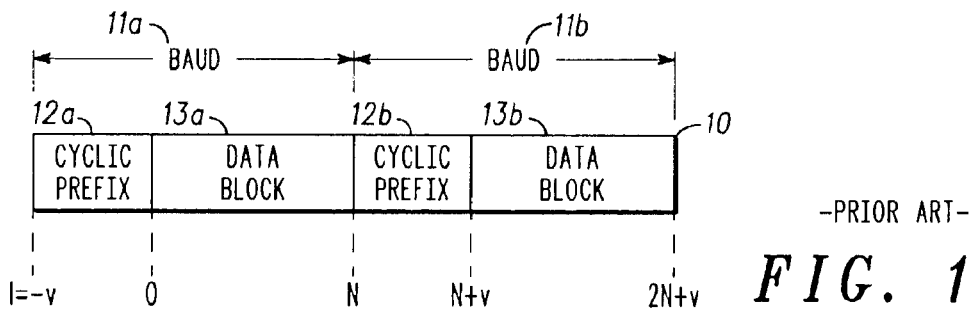
FIG. 1 illustrates a timing diagram of a single-carrier transmitted signal having cyclic prefixes as known in the art.

FIG. 1 illustrates a cyclic prefix single-carrier transmitted signal 10 as known in the art. The signal 10 includes a baud 11a consisting of a cyclic prefix 12a and a data block 13a where cyclic prefix 12a is a repetition of the last v samples (cyclic prefix of length v) of the data block 13a. The cyclic prefix may also be referred to as a cyclic extension, and the samples between data blocks 13a and 13b can also be referred to as a guard period. The baud 11a is followed by a baud 11b consisting of a cyclic prefix 12b and a data block 13b. The baud 11b is followed by additional bauds (not shown) also consisting of cyclic prefixes and data blocks. The cyclic prefix 12a and the cyclic prefix 12b, as well as the other cyclic prefixes of the signal 10, have a length of v samples. The data block 13a and the data block 13b, as well as the other data blocks of signal 10, include N number of data samples.

Several advantages of the signal 10 in a multipath channel are the elimination of inter-baud interference within the signal 10 and the circular appearance of the channel for data blocks of the transmitted signal 10 (i.e., a linear convolution of the channel with the transmitted signal 10 appears at a receiver as a circular convolution for the data block of the transmitted signal 10 thereby maintaining orthogonality between different bins or subcarriers in the frequency domain). This allows for efficient frequency domain processing in a receiver. A disadvantage of the signal 10 is that a receiver of the signal 10 usually ignores the channel outputs corresponding to the cyclic prefix 12a, the cyclic prefix 12b and the other cyclic prefixes of the signal 10. This results in a waste of energy relating to cyclic prefix 12a, the cyclic prefix 12b and the other cyclic prefixes of the signal 10.

Also in the prior art, a single-carrier TDM/TDMA transmission format has replaced the cyclic prefix 12a and the cyclic prefix 12b with a known sequence. If a receiver for this format uses a discrete Fourier transform of size N+v, including for example the data block 13a and the subsequent prefix 12b, then the entire block of N+v samples appears to have a conventional cyclic prefix 12a, provided the sequence used in the cyclic prefix 12a is the same as the sequence used in the cyclic prefix 12b (and likewise for all subsequent baud intervals). The present invention enables different known sequences (training blocks) to be used for different data blocks, it enables the discrete Fourier transform size to remain at N in some embodiments (rather than N+v), and it provides methods that can be used with multicarrier signals (such as OFDM) as well as other FDMMs.

Figure 2:
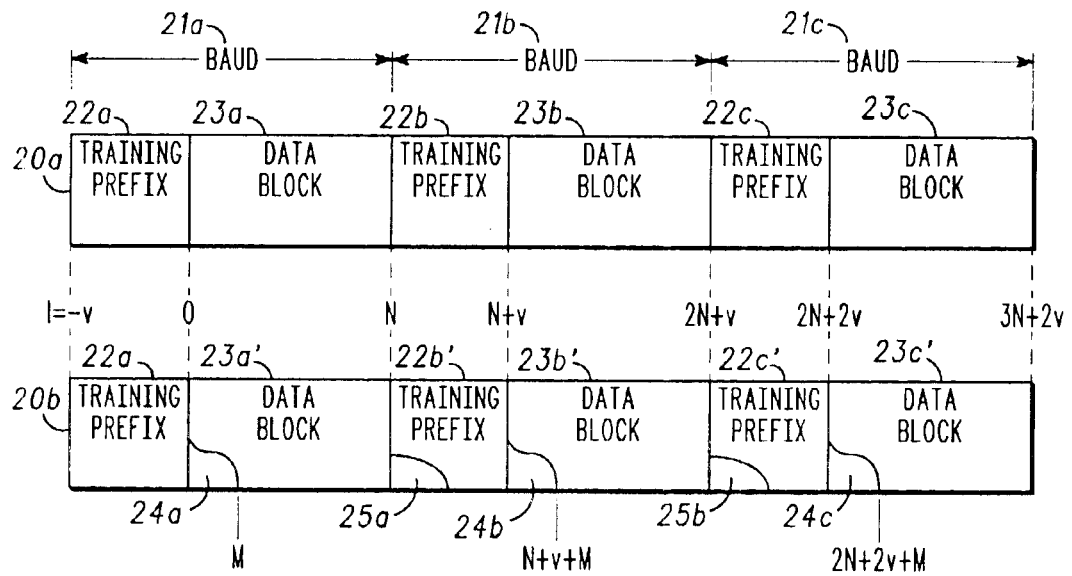
FIG. 2 illustrates a timing diagram of a transmission and a reception of a FDMM signal having training blocks in accordance with the present invention.

FIG. 2 illustrates a FDMM with training blocks signal 20a. The signal 20a includes a baud 21a consisting of a training block in the form of a training prefix 22a, and a data block 23a where the training prefix 22a is any known signal pattern of length v samples. The baud 21a is followed by a baud 21b consisting of a training block in the form of a training prefix 22b, and a data block 23b. The baud 21b is followed by a baud 21c consisting of a training block in the form of a training prefix 22c, and a data block 23c. The baud 21c can be followed by additional bauds (not shown). In the present invention, the training prefixes 22a, 22b, and 22c can be different from each other, and training prefixes for additional forms of modulation (e.g., OFDM) are enabled. The training prefix 22a, the training prefix 22b and the training prefix 22c, as well as the other training prefixes of the signal 20a preferably all have the same length of v samples, but are not required to have the same length. The data block 23a, the data block 23b, and the data block 23c, as well as the other data blocks of signal 20a, preferably all have the same length of N samples, but are not required to have the same length.

In one embodiment of the invention, a multicarrier signal is generated and formatted in accordance with the baud format of FIG. 2. This embodiment creates a multicarrier signal block with a training extension, which can be transmitted over a channel and used by a receiver in accordance with one of the other receiver-related or reconstruction-related embodiments of the present invention as illustrated in FIGS. 5–10. For the multicarrier embodiment, a multicarrier signal block with a training extension is generated by extending a multicarrier signal block with a known training block, where the position of the extension is: A) a prefix, B) a postfix, C) a combination of a prefix and a postfix. The baud format of FIG. 2, when used to describe a multicarrier baud, illustrates the case where the training extension is a training prefix. Also, a multicarrier signal block can be represented by a data block in FIG. 2. For an OFDM multicarrier signal, a data block of FIG. 2 is preferably a time domain signal which represents a block of frequency domain symbols. A time domain signal which represents a block of frequency domain symbols is typically generated by taking an inverse discrete or fast fourier transform of the block of frequency domain symbols, as is known in the art for OFDM.

Advantages of the signal 20a are that the pilot symbol overhead required for channel estimation and tracking can be reduced, and the channel estimation in a receiver of the signal 20a can be improved. A disadvantage of the signal 20a is a loss of the circular appearance of the channel within the data block of the signal 20a in a multi-path channel. Specifically, a signal 20b is a version of the signal 20a at the output of a multi-path channel in communication with a receiver with interference contributions due to inter-block-interference (IBI) such as training IBI 24a, a data IBI 25a, a training IBI 24b, a data IBI 25b and a training IBI 24c. The received data block 23a' is the result of the channel filtering both the transmitted training prefix 22a and the transmitted data block 23a. When the channel filters the training prefix 22a, a portion of it is received during data block 23a', and this portion is called the training IBI 24a. The received training prefix block 22b' is the result of the channel filtering both the transmitted data block 23a and the training prefix 22b. When the channel filters the data block 23a, a portion of it is received during training prefix block 22b', and this portion is called the data IBI 25a. The received data block 23b' is the result of the channel filtering both the transmitted training prefix 22b and the transmitted data block 23b. When the channel filters the training prefix 22b, a portion of it is received during data block 23b', and this portion is called the training IBI 24b. The received training prefix block 22c' is the result of the channel filtering both the transmitted data block 23b and the training prefix 22c. When the channel filters the data block 23b, a portion of it is received during training prefix block 22c', and this portion is called the data IBI 25b. The received data block 23c' is the result of the channel filtering both the transmitted training prefix 22c and the transmitted data block 23c. When the channel filters the training prefix 22c, a portion of it is received during data block 23c', and this portion is called the training IBI 24c. For conventional receiver processing algorithms for CP-SC systems which ignore the channel outputs corresponding to the cyclic prefix at the receiver, the loss of the circular appearance of the channel within the data block results in a loss of subcarrier orthogonality and a corresponding degradation in the performance of the receiver.

In the description of the invention, the term "data block" is not intended to imply a limitation on the contents of a data block (such as 23a in FIG. 2) to a particular type of information. For example, a data block may include one or more types of information such as user data, pilot symbols, control information, signaling, link maintenance information, broadcast information, and so forth, and such information may be coded or uncoded.

Figure 3:
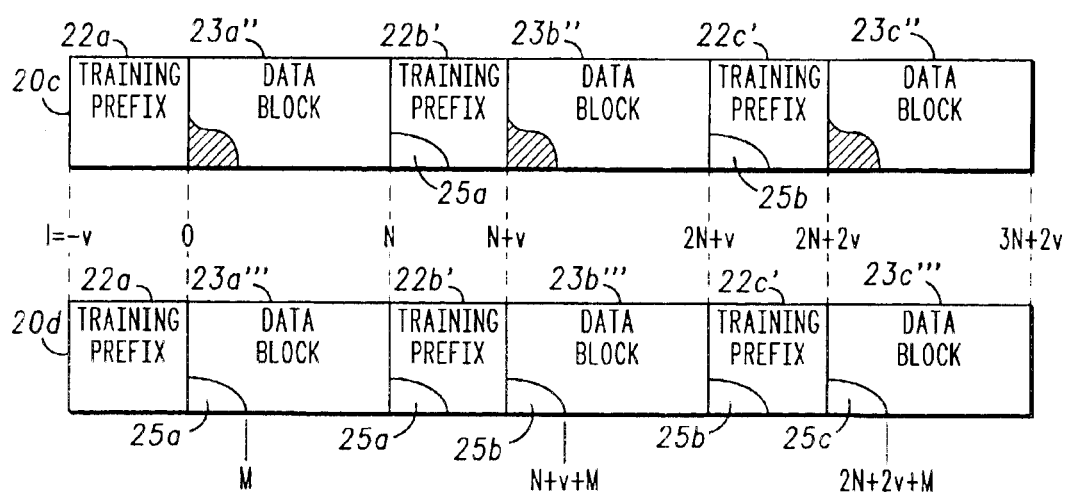
FIG. 3 illustrates a timing diagram of a first embodiment of a reconstruction of the received signal of FIG. 2 in accordance with the present invention.

FIG. 3 illustrates a first embodiment in accordance with the present invention of a reconstruction of the signal 20b (FIG. 2) to a signal 20d. First, the signal 20b is reconstructed to a signal 20c that excludes the training IBI 24a from data block 23a', the training IBI 24b from data block 23b', and the training IBI 24c from data block 23c'. Second, the signal 20c is reconstructed to signal 20d that includes the data IBI 25a within a data block 23a''', the data IBI 25b within a data block 23b''', and to include the data IBI 25c within a data block 23c'''. The result is that each of the reconstructed data blocks 23a''', 23b''', and 23c''' now appear to have been propagated over a circular channel. Note that the described steps are given in the preferred order, but the principles of linearity and superposition may allow the order of the steps to be changed from the described order in the present embodiment or other embodiments. For example, the data IBI can be reconstructed as the first step and the training IBI can be removed as the second step. The reconstruction as illustrated in FIG. 3 can be iterated to further refine the circular appearance of the channel over one or more of the data blocks 23a'''–23c''' of the signal 20d, as will be described later. For the purpose of illustration, the depicted embodiment includes three sequential data blocks, each with a training prefix, and the signal reconstruction is described for all three data blocks. However, note that the invention is not limited to reconstructing the complete group of data blocks as has been described. For example, a sequential implementation of the reconstruction can operate independently on each data block. In another example, different data blocks may be addressed to different users, and in such a case it may not be necessary to reconstruct data blocks that are addressed to a different user.

Figure 4:
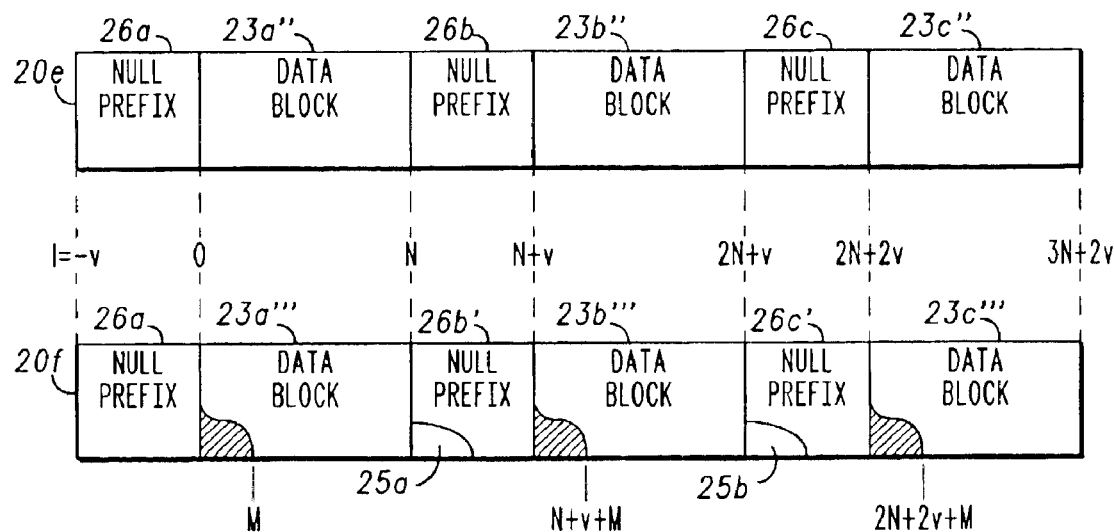
FIG. 4 illustrates a timing diagram of a second embodiment of a reconstruction of the received signal of FIG. 2 in accordance with the present invention.

FIG. 4 illustrates a second embodiment in accordance with the present invention of a reconstruction of the signal 20b (FIG. 2) to a signal 20f. First, the signal 20b is reconstructed to a signal 20e having training prefix 22a, training prefix 22b, and training prefix 22c replaced by a null prefix 26a, a null prefix 26b, and a null prefix 26c, respectively (the null prefix, also referred to as a null block, is a block of v zeros). Additionally, in the transformation, the training IBI 24a is excluded from data block 23a', the training IBI 24b is excluded from data block 23b', and the training IBI 24c is excluded from data block 23c'. Second, the signal 20e is reconstructed to signal 20f that includes the data IBI 25a within the null prefix 26b', the data IBI 25b within the null prefix 26c'. The result is that each of the combined blocks 23a''' and 26b', and 23b''' and 26c' now appear to have been propagated over a circular channel. The reconstruction as illustrated in FIG. 4 can be iterated to further refine the circular appearance of the channel, as will be described later. For the purpose of illustration, the depicted embodiment includes three sequential data blocks, each with a training prefix, and the signal reconstruction is described for all three data blocks. However, note that the invention is not limited to reconstructing the complete group of data blocks as has been described. For example, a sequential implementation of the reconstruction can operate independently on each data block. In another example, different data blocks may be addressed to different users, and in such a case it may not be necessary to reconstruct data blocks that are addressed to a different user.

From the preceding descriptions of the reconstructions of the signal 20b to the signal 20d and to the signal 20f, respectively, those having ordinary skill in the art will appreciate a reconstruction in accordance with the present invention of a signal having training blocks in the form of either a training prefix or a training postfix or a combination of a training prefix and a training postfix.

Figure 5:
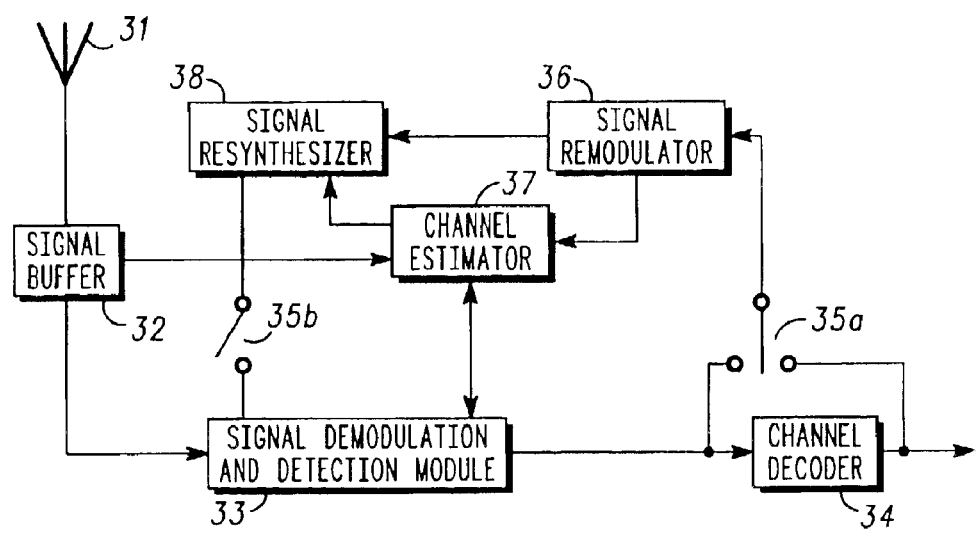
FIG. 5 illustrates a block diagram of one embodiment of a receiver in accordance with the present invention.

FIG. 5 illustrates one embodiment of a receiver 30 in the accordance with the present invention. The receiver 30 includes an antenna 31, a signal buffer 32, a signal demodulation and detection ("SDD") module 33, a channel decoder 34, a switch 35a, a signal remodulator 36, a channel estimator 37, a signal resynthesizer 38, and a switch 35b. An operational description of the receiver 30 will now be provided herein in the context of a processing of the signal 20b which propagated through a channel in communication with the antenna 31. From the operational description of the receiver 30, those having ordinary skill in the art will appreciate a processing by the receiver 30 in accordance with the present invention of a signal having training blocks in the form of either a training prefix or a training postfix or a combination of a training prefix and a training postfix.

Figure 6:
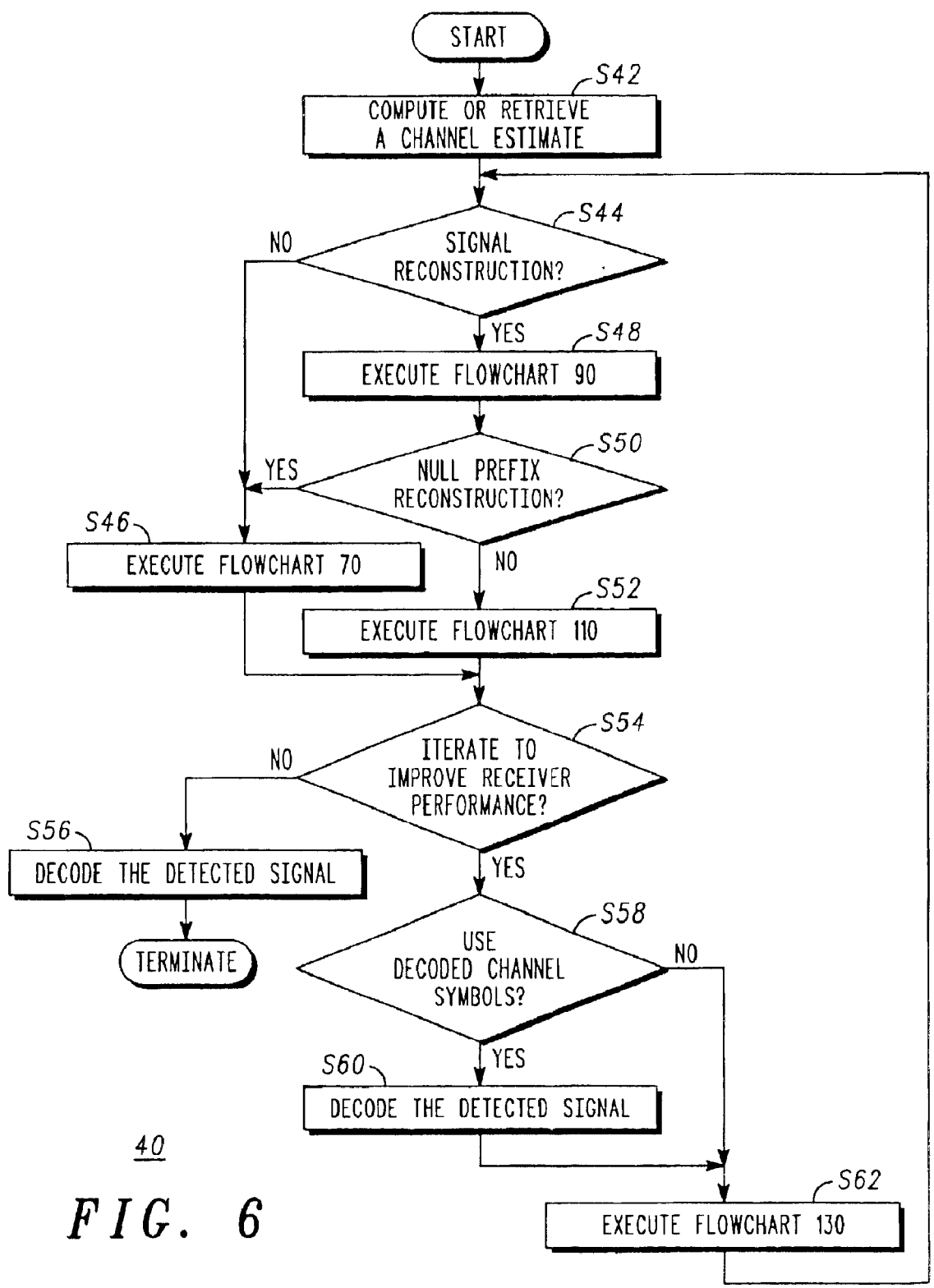
FIG. 6 illustrates a flowchart representative of one embodiment of a signal detection and decoding method in accordance with the present invention.

The signal buffer 32 is any type of memory for receiving and storing the signal 20b (FIG. 1) or a portion thereof upon receipt thereof by the antenna 31. The received signal 20b may be processed by a RF front-end and downconverted from RF to baseband and/or sampled prior to the signal buffer 32. In response to the signal 20b being received and stored by the signal buffer 32, the receiver 30 executes a signal decoding method in accordance with the present invention. FIG. 6 illustrates a flowchart 40 as a representation of the signal decoding method. The receiver 30 may process the received data according to flowchart 40 on a per data block basis or on multiple data blocks or a combination thereof. Flowchart 40 can be repeated for subsequent data blocks. The description below exemplifies the detection and decoding process for a data block such as 23a (FIG. 2).

FIG. 6 illustrates the flowchart 40. During a stage S42 of the flowchart 40, the channel estimator module 37 either computes or retrieves a previously determined estimate of a channel pulse response ("CPR") $p_l$ through which the data block 23a of signal 20a (FIG. 2) propagates resulting in the received data block 23a' of signal 20b (FIG. 2). In one embodiment, the training prefixes ($t_k$, k=0 . . . v−1) of the signal 20a have a length of v samples. Time can be indexed within the baud 21a from −v to N−1, where N is the number of samples in the data blocks ($d_k$, k=0 . . . N−1) of the signal 20a. The samples $x_l$ of baud 21a and training prefix 22b of signal 20a can be modeled in accordance with the following equations [1]:

$$x_{-l}=t_{v-1}l=1 \ldots v \; x_l=d_l l=0 \ldots (N-1) \; x_{N\;1+l}=t_{l-1}l=1 \ldots v \quad [1]$$

This equation is presented for the case where the training prefixes 22a and 22b are identical, but this equation can be reformulated for the case where these training prefixes are different. The (CPR) $p_l$ is a combined response of transmit filters, the channel and receiver filters and is assumed to be of length M+1, where the training prefix length v is preferably chosen such that M≤v. The baseband received samples, $y_l$, of baud 21a and training prefix 22b of FIG. 2, after propagating through the multipath channel and being corrupted by additive noise and/or interference $n_l$, can be modeled in accordance with the following equation [2]:

$$y_l = \sum_{m=0}^{M} x_{l-m} \cdot p_m + n_l \quad l = -v \; \ldots \; (N+v-1) \quad [2]$$

During a stage S44 of the flowchart 40, the SDD module 33 ascertains whether to execute a signal reconstruction of the data block 23a' based on the characteristics of the transmitted signal and the available receiver processing power. If the SDD module 33 determines that an execution of a signal reconstruction of the data block 23a' is not warranted, the SDD module 33 proceeds to a stage S46 of the flowchart 40 to implement a flowchart 70 representative of a first embodiment of an information detection method of the present invention. If the SDD module 33 determines that an execution of a signal reconstruction of the data block 23a' is warranted, the SDD module 33 proceeds to a stage S48 of the flowchart 40 to implement a flowchart 90 representative of one embodiment of a signal reconstruction method of the present invention.

The operational thresholds for the characteristics of the transmitted signal and the available receiver processing power that warrant a signal reconstruction of the signal 20b are dependent upon operational specifications of receiver 30 and are therefore not specified with this description of the flowchart 40. However, those having ordinary skill in the art will appreciate a proper association of such operational thresholds to a receiver fabricated in accordance with the present invention. In addition, note that the decision of whether to perform signal reconstruction can be made at the time the receiver is being designed, taking into account various factors such as the available processing power and the performance improvement that would be provided by reconstruction, which can be estimated using computer simulations of the receiver performance.

Figure 7:
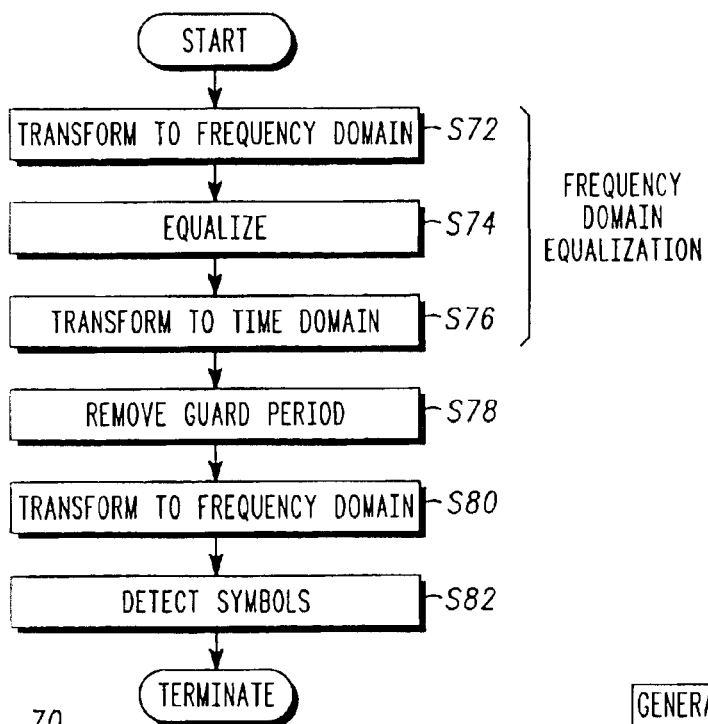
FIG. 7 illustrates a flowchart representative of a first embodiment of a signal detection method in accordance with the present invention.

FIG. 7 illustrates a flowchart 70 for detecting channel symbols (e.g., hard symbols, hard bits, soft symbols and/or soft bits) within data block 23a'. During a stage S72 of the flowchart 70, the SDD module 33 conventionally transforms a portion of signal 20b containing data block 23a' and training prefix 22b' into the frequency domain, preferably with a fast Fourier transform ("FFT") of a size=N+v. During a stage S74 of the flowchart 70, the SDD module 33 conventionally equalizes the signal within the frequency domain. During a stage S76 of the flowchart 70, the SDD module 33 conventionally transforms the equalized signal 20b from the frequency domain to the time domain, preferably with an inverse FFT ("IFFT") of a size=N+v. Stages S72–S76 represent a linear frequency domain equalization of the signal. In alternative embodiments of the flowchart 70, stages S72–S76 can be replaced by stages representative of a linear transversal time-domain equalization, or another appropriate form of equalization.

Figure 8:
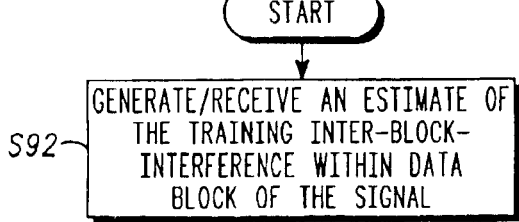
FIG. 8 illustrates a flowchart representative of one embodiment of a signal reconstruction method in accordance with the present invention.
Figure 8:
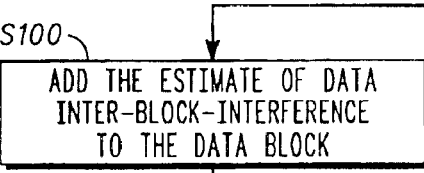
Figure 8:
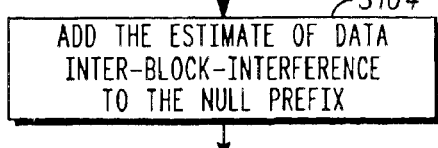

During a stage S78 of the flowchart 70, the SDD module 33 conventionally removes the training prefix (i.e., a guard period) of the equalized signal. During a stage S80 of the flowchart 70, the SDD module 33 conventionally transforms the equalized signal without the training prefix into the frequency domain, preferably with a FFT of a size=N. In one embodiment, stage S80 is performed only for OFDM and any variations thereof (e.g. MC-CDMA/SOFDM), and is omitted for single carrier signals. During a stage S82 of the flowchart 70, the SDD module 33 conventionally detects the channel symbols (e.g., by outputting one or more of: soft or un-sliced symbols, hard or sliced symbols, soft bits, hard bits). The flowchart 70 is terminated upon a completion of stage S82 with the result being a detection of the channel symbols within data block 23a'. Referring again to FIG. 6, upon completion of stage S46, the receiver 30 proceeds to stage S54 of the flowchart 40 to ascertain whether to improve upon the performance of the receiver 30 by using iteration. FIG. 8 illustrates the flowchart 90. During a stage S92 of the flowchart 90, the SDD module 33 generates or receives an estimate of the training IBI 24a. In one embodiment, the SDD module 33 generates the estimate of the training IBI 24a as a weighted sum of training prefix samples 22a where the weights are proportional to an estimate of the channel pulse response, $\hat{p}_l^a$ (where $\hat{p}_l^a$ is the current (or previous) iteration estimate of the CPR), in accordance with the following equation [3]:

$$t_l^{ibi} = \sum_{m=0}^{M} t_{l+v-m} \cdot \hat{p}_l^a \quad l = 0 \ldots (M-1) \quad [3]$$

Upon completion of the stage S92, the SDD module 33 proceeds to a stage S94 of the flowchart 90 to subtract the estimate of the training IBI 24a from the data block 23a' to yield the data block 23a' of signal 20c (FIG. 3), which is illustrated over multiple bauds for the purpose of illustration, in accordance with the following equation [4]:

$$z_l = y_l - t_l^{ibi} \quad l = 0 \ldots (M-1) \quad [4]$$

Upon completion of the stage S94, the SDD module 33 proceeds to a stage S96 of the flowchart 90 to generate an estimate of the data IBI 25a. In one embodiment, the SDD module 33 generates an estimate of the data IBI 25a based on the received signal samples, training prefix samples, estimates of the CPR $\hat{p}_l^b$ $\hat{p}_l^c$ and a remodulated signal $\hat{x}_l$ in accordance with the following equation [4]:

$$d_l^{ibi} = \quad [5]$$

$$(1-a) \cdot \left( y_{N+1} - \sum_{m=0}^{M} t_{l-m} \cdot \hat{p}_m^b \right) + a \sum_{m=0}^{M} \hat{x}_{l+N-m} \cdot \hat{p}_m^c \quad l = 0 \ldots (M-1)$$

In this equation, the remodulated signal $\hat{x}_l$ (as elaborated later) is an estimate of the data transmitted within data block 23a. The estimates of the CPR, $\hat{p}_l^a$, $\hat{p}_l^b$, $\hat{p}_l^c$ can be the current iteration CPR estimate, or any one of the previous iteration CPR estimates. The feedback gain factor, α, on the remodulated signal (0<α<=1) determines the percentage of data portion IBI being updated in the current iteration relative to first iteration estimate, previous iteration estimates, or a combination thereof. In one embodiment, the feedback gain α is set to 0 on the first iteration. When α=0, the data IBI estimate is affected by channel noise. As a result, when the data IBI estimate is added to the data block, the total noise power is increased. In order to counter the increased noise power, an iterative, decision aided IBI estimation method may be used. During the initial iterations, small values of alpha can be used thereby introducing less error due to incorrect symbol/bit decisions, while improving the receiver performance as the estimator noise is reduced. On subsequent iterations, as the confidence in the decoded/detected symbol/bit decisions improve, the value of alpha can be increased (preferred) making it closer to one, further reducing the estimator noise and improving receiver performance. In an alternate embodiment, an initial signal detection based on conventional methods can be performed to estimate the remodulated signal $\hat{x}_l$ prior to the first iteration, thus enabling the option of setting α>0 for the first iteration. This alternate embodiment is anticipated to be useful when the channel pulse response is much smaller than the cyclic prefix length.

Upon completion of the stage S96, the SDD module 33 proceeds to a stage S98 of the flowchart 90 ascertain whether to implement a null prefix reconstruction. When the SDD module 33 determines a null prefix reconstruction is not warranted, the SDD module 33 proceeds to a stage S100 of the flowchart 90 to add the estimate of the data IBI 25a to the data block 23a" to thereby yield data block 23a''' of the signal 20d (FIG. 3), which is illustrated over multiple bauds for the purpose of illustration, in accordance with the following equation [6]:

$$y_l^{cir} = \begin{cases} z_l + d_l^{ibi} & l = 0 \ldots (M-1) \\ y_l & l = M \ldots (N-1) \end{cases} \quad [6]$$

Upon completion of the stage S100, the N samples of the data block 23a''' of signal 20 replace the training prefix 22b with a null prefix 26b, to thereby yield a corresponding portion of the signal 20e (FIG. 4). Thereafter, the SDD module 33 proceeds to a stage S104 of the flowchart 90 to add the estimate of the data IBI 25a to the null prefix 26b, to thereby yield a corresponding portion of the signal 20f (FIG. 4). Upon completion of the stage S102 and S104, the N+v samples corresponding to the combined data block 23a''' and prefix block 26b' of signal 20f channel appear to have been received over a circular channel and are in accordance with the following equation [7]:

$$y_l^{null} = \begin{cases} z_l & l = 0 \ldots (M-1) \\ y_l & l = M \ldots (N-1) \\ d_{l-N}^{ibi} & l = N \ldots (N+M-1) \\ 0 & l = (N+M) \ldots (N+v-1) \end{cases} \quad [7]$$

In another embodiment of the invention, the null prefix 26b' with the data IBI 25a is obtained by subtracting out an estimate of the training prefix block 22b'.

Referring again to FIG. 6, upon completion of stage S48, the receiver 30 proceeds to a stage S50 to ascertain whether a null prefix reconstruction was implemented during stage S48. When a null prefix reconstruction was implemented during stage S48, the receiver 30 proceeds to stage S46 to detect information within data block 23a''' of signal 20f (FIG. 4) in a manner analogous to the detection of information within data block 23a' of signal 20b as described in connection with FIG. 7. Thereafter, the receiver 30 proceeds to stage S54 to ascertain whether to improve upon the performance of the receiver 30 by using iteration.

Figure 9:
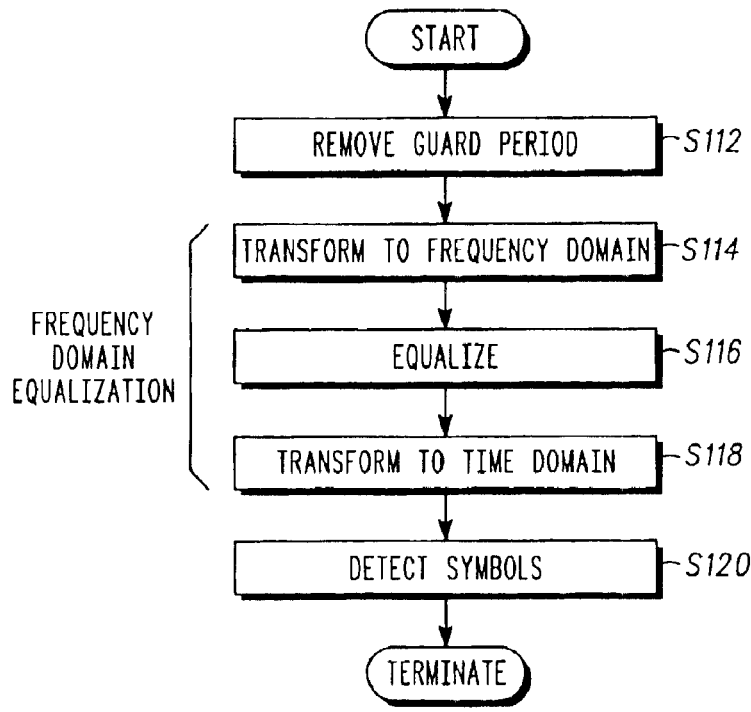
FIG. 9 illustrates a flowchart representative of a second embodiment of a signal detection method in accordance with the present invention.

When a null prefix reconstruction was not implemented during stage S48, the receiver 30 proceeds to stage S52 of the flowchart 40 to implement a flowchart 110 representative of a second embodiment of an information detection method of the present invention. FIG. 9 illustrates the flowchart 110 for detecting channel symbols (e.g., hard symbols, hard bits, soft symbols and/or soft bits) within data block 23a''' of signal 20d. During a stage S112 of the flowchart 110, the SDD module 33 removes training prefix 22a (i.e., guard period) of the signal 20e. During a stage S114 of the flowchart 110, the SDD module 33 conventionally transforms the data block 23a''' of signal 20d into the frequency domain, preferably with a FFT of a size=N. During a stage S116 of the flowchart 110, the SDD module 33 conventionally equalizes the signal within the frequency domain. For an OFDM signal, the equalization can be a conventional complex channel gain compensation on each subcarrier. During a stage S118 of the flowchart 110, the SDD module 33 conventionally transforms the equalized signal from the frequency domain to the time domain, preferably with an IFFT of a size=N. Stage S118 is omitted for OFDM and any variations thereof. During a stage S120 of the flowchart 110, the SDD module 33 conventionally detects the channel symbols. The flowchart 110 is terminated upon a completion of stage S120 with the result being a detection of the channel symbols within data block 23a''' of signal 20d. Stages S114–S118 represent a linear frequency domain equalization of the signal. If the transmitted signal is a single carrier signal, in an alternative embodiment, stages S114–S118 can be replaced by stages representative of a linear transversal time-domain equalization, a decision feedback equalization, a maximum likelihood sequence estimator, or another known form of equalization.

Referring again to FIG. 6, upon completion of stage S52, the receiver 30 proceeds to stage S54 to ascertain whether to improve upon the performance of the receiver 30 by using iteration.

The receiver 30 proceeds to a stage S56 of the flowchart 40 when iteration is not selected. During a stage S56 of the flowchart 110, the channel decoder 34 decodes the detected channel symbols. Note that the channel decoder 34 may include additional conventional aspects such as de-interleaving and buffering of information that is part of a codeword, and that a codeword may span more than one data block. The receiver 30 then proceeds to terminate flowchart 40.

The receiver 30 proceeds to a stage S58 of the flowchart 40 when iteration is selected to ascertain whether decoded channel symbols are used in the iteration. For the case when the decoded channel symbols are used, the receiver 30 proceeds to a stage S60 of the flowchart 40 to decode the detected channel symbols. Additionally, the switch 35a is set in a position to establish communication between the channel decoder 34 and the signal remodulator 36. Note that the channel decoder 34 may include additional conventional aspects such as de-interleaving and buffering of information that is part of a codeword, and that a codeword may span more than one data block. Additionally, the switch 35b is set in a position to establish communication between the signal resynthesiser 38 and the SDD module 33. The receiver 30 can therefore proceed to a stage S62 of the flowchart 40 to implement a flowchart 130 representative on one embodiment of a signal remodulation method in accordance with present invention.

Alternatively, when selected to not use the decoded channel symbols, the switch 35a is set in a position to establish communication between the SDD module and the signal remodulator 36. Additionally, the switch 35b is set in a position to establish communication between the signal resynthesiser 38 and the SDD module 33. The receiver 30 can therefore proceed to a stage S62 of the flowchart 40 to implement a flowchart 130 representative on one embodiment of a signal remodulation method in accordance with present invention.

Figure 10:
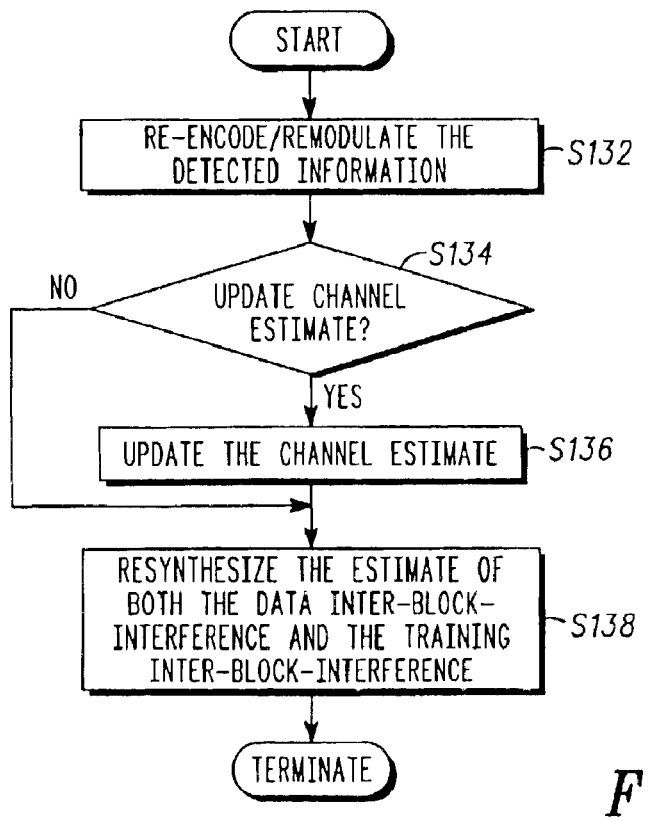
FIG. 10 illustrates a flowchart representative of one embodiment of a signal remodulation method in accordance with the present invention.

FIG. 10 illustrates the flowchart 130. During a stage S132 of the flowchart 130, the signal remodulator 36 remodulates the detected/decoded channel symbols (hard symbols, hard bits, soft symbols and/or soft bits or a combination thereof). This remodulation involves an initial re-encoding of the information if the signal remodulator 36 is receiving information from the channel decoder 34. In one embodiment, the samples at the output of signal remodulator 36 are estimates of the transmitted data block 23a. In addition, the preferred embodiment uses null prefixes instead of training prefixes in the remodulation stage 36 (note that null prefixes can be used in the remodulation stage 36 even though the transmitted signal may contain a training prefix) as it results in lower computational complexity for equivalent performance. Samples of the remodulated signal corresponding to baud 21a and prefix 22b are in accordance with the following equation [8]:

$$\hat{x}_{-l} = 0 l = 1 \ldots v \; \hat{x}_l = \hat{d}_l = 0 \ldots (N-1) \; \hat{x}_{N-1+l} = 0 l = 1 \ldots v \quad [8]$$

The signal remodulator may only re-modulate the portion of the signal needed for subsequent processing.

Upon completion of the stage S132, the receiver 30 proceeds to a stage S134 of the flowchart 130 to ascertain whether channel estimator 37 will need to update the channel estimate during a stage S136 of the flowchart 130, or use the previous iteration channel estimate. If the previous iteration channel estimate is to be used, then flow proceeds to stage S138. If the channel estimate is to be updated, then flow proceeds to stage S136, where the channel estimate is updated. Then in stage S138, both the data inter-block interference and the training inter-block interference are estimated according to equation 5 and 3 respectively.

The flowchart 130 is terminated upon completion of stage S138. Upon completion of the stage S58, the stages S44–S54 are selectively executed as previously described herein in connection with FIGS. 5–9. These subsequent iterations of the stages S44–S54 facilitate a circular appear ance of the channel in accordance with either the following equations [10] or [11]:

$$y_l^{cir} = \begin{cases} z_l + d_l^{ibi} & l = 0 \ldots (M-1) \\ y_l & l = M \ldots (N-1) \end{cases} \quad [10]$$

$$y_l^{null} = \begin{cases} z_l & l = 0 \ldots (M-1) \\ y_l & l = M \ldots (N-1) \\ d_{l-N}^{ibi} & l = N \ldots (N+M-1) \\ 0 & l = (N+M) \ldots (N+v-1) \end{cases} \quad [11]$$

For the present invention, the choice of waveforms for the training prefix can be any signal such as a reduced symbol duration OFDM training symbol (short OFDM symbol) or a single carrier training sequence. A signal with a close to flat amplitude spectrum and low peak-to-average power ratio is desirable as it enables the channel estimate errors to be frequency independent and may allow the training prefix to be transmitted at a higher power level than the data block while maintaining the same power amplifier backoff requirement. The present invention also enables the training prefix waveform to be different for different data blocks, except for the case of OFDM-type signals where signal reconstruction is not used (i.e., "no" is selected in S44 of FIG. 6). For this latter case, it is preferred that the training prefixes be identical for adjacent data blocks, so that the equalizer performance will be improved. Since the present invention can enable the use of different training prefixes for different data blocks, it can be applied to CDMA systems where the training prefix is a pilot block multiplied by a long code or scrambling code or PN sequence. In this case, the long code/scrambling code/PN sequence causes the transmitted training prefixes to be different even if they were the same prior to applying the long code/scrambling code/PN sequence. The proposed methods can also be used when a data slot is preceded and/or followed by an idle slot. In this case, the idle slot is treated as a training prefix/postfix containing zeros (null prefix or postfix), as appropriate.

Although the procedures in flowchart 40 are described in the time domain, the signal reconstruction can also be done in the frequency domain because the FFT operation (or equivalent frequency-domain transform) is a linear transform. In other words, the data block 23a' (FIG. 2) can be brought into the frequency domain through FFT processing and then the frequency-domain equivalent of the training IBI 24a can be subtracted from the frequency domain representation of data block 23a' and finally the frequency-domain equivalent of the data IBI 25a can be added to the result.

Each component of the receiver 30 (FIG. 5) as described may be implemented in hardware (analog or digital), software, or any combination of hardware and software. Those having ordinary skill in the art will appreciate a sequential operation of the components of the receiver 30 (e.g., in a software implementation) and a concurrent operation of each component of the receiver 30 (e.g., in a hardware implementation).

While the receiver 30 was described herein in the context of a complete implementation of the flowchart 40 to facilitate a comprehensive understanding of the present invention, in practice, a significant number of receivers will be designed in accordance with the present invention to take a particular path through the flow chart 40. Specifically, the yes/no decisions of the stages S44, S50, S54, and/or S58 can be predetermined during a design phase of such receivers in view of various factors, including, but not limited to, processing power, battery drain, expected channel conditions, and the characteristics of the transmitted signal (e.g., OFDM, single carrier). Similarly, when the flowchart 90 and/or the flowchart 130 are employed in such receivers, the yes/no decisions of the stages S98 and/or S134 can be predetermined during a design phase of such receivers. Additionally, in practice, a predetermined path through the various stages of the flow chart 40 can follow the illustrated stage sequence as described herein or an alternative stage sequence that may include concurrent execution of some of the stages. The same holds true for the various stages of the flow chart 98 and the various stages of the flow chart 134. The scope of the claims are therefore intended to encompass a practical implementation of the present invention as explained in the preceding sentences.

The present invention may be embodied in other specific forms without departing from its spirit or essential characteristics. For example, the mathematical principles of linearity and superposition may enable the re-ordering of certain steps of the described embodiments, or may enable additional specific embodiments having essentially the same function, and that such variations are within the scope of the present invention. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A method for reconstructing a signal including a data block having a first inter-block-interference and a training block having a second inter-block-interference, said method comprising:
   reconstructing the data block to exclude the first inter-block-interference; and
   reconstructing the data block to include the second inter-block-interference.

2. The method of claim 1, further comprising;
   transforming the reconstructed data block into a frequency domain data block; and
   detecting symbols based on at least the frequency domain data block.

3. The method of claim 1,
   wherein the reconstruction provides a reconstructed data block having a characteristic of circular convolution with a channel pulse response; and
   further comprising processing the reconstructed data block based on the circular convolution property and an estimate of the channel pulse response to facilitate data detection.

4. The method of claim 1, wherein the estimate of the channel pulse response is represented in the frequency domain.

5. A receiver, comprising:
   a buffer operable to store a signal including a data block having a first inter-block-interference and a training block having a second inter-block-interference; and
   one or more modules operable to reconstruct the data block to exclude the first inter-block-interference and to include the second inter-block-interference.

6. A method for reconstructing a signal including a data block having a first inter-block-interference and a training block having a second inter-block-interference, said method comprising:
   replacing the training block with a null block; and
   constructing the null block to include the second inter-block-interference.

7. The method of claim 6, wherein the step of constructing the null block to include the second inter-block-interference includes:
   generating an estimate of the second inter-block-interference; and adding the estimate of the second inter-block-interference to the null block.

8. The method of claim 6, further comprising reconstructing the data block to exclude the first inter-block-interference.

9. The method of claim 8, wherein the step of reconstructing the data block to exclude the first inter-block-interference includes:
generating an estimate of the first inter-block-interference; and
subtracting the estimate of the first inter-block-interference from the data block.

10. A receiver, comprising:
a buffer operable to store a signal including a data block having a first inter-block-interference and a training block having a second inter-block-interference; and
one or more modules operable to replace the training block with a null block and to construct the null block to include the second inter-block-interference.

11. The receiver of claim 10, wherein said one or more modules are further operable to generate an estimate of the second inter-block-interference, and to add the estimate of the second inter-block-interference to the null block to construct the null block to include the second inter-block-interference.

12. The receiver of claim 10, wherein said one or more modules are further operable to reconstruct the data block to exclude the first inter-block-interference.

13. The receiver of claim 12, wherein said one or more modules are further operable to generate an estimate of the first inter-block interference and subtract the estimate of the first inter-block interference from the data block to reconstruct the data block to exclude the first inter-block-interference.

14. A method for processing a signal propagating through a channel, the signal including a data block and a training block, the data block including information and a first inter-block-interference, the training block including a second inter-block-interference, said method comprising:
receiving the signal;
selectively executing one or more reconstructions of the data block to exclude the first inter-block-interference and to include the second inter-block-interference; and
demodulating the signal as received or reconstructed whereby the information is detected.

15. A receiver for receiving a signal propagating through a channel, the signal including a data block and a training block, the data block including information and a first inter-block-interference, the training block including a second inter-block-interference, said receiver comprising:
a buffer operable to store the signal; and
one or more modules operable to executing one or more reconstructions of the data block to exclude the first inter-block-interference and to include the second inter-block-interference, said one or more modules further operable to demodulate the signal as received or as reconstructed whereby the information is detected.

16. A method for reconstructing a signal including a data block having a first inter-block-interference and a training block having a second inter-block-interference, said method comprising:
generating an estimate of the first inter-block interference;
subtracting the estimate of the first inter-block interference from the data block; and
reconstructing the data block to include the second inter-block-interference.

17. The method of claim 16, wherein the estimate of the first inter-block interference is generated according to:

$$t_l^{ibi} = \sum_{m=0}^{M} t_{l+v-m} \cdot \hat{p}_l^a \quad l = 0 \ldots (M-1).$$

18. A method for reconstructing a signal including a data block having a first inter-block-interference and a training block having a second inter-block-interference, said method comprising:
reconstructing the data block to exclude the first inter-block-interference;
generating an estimate of the second inter-block interference; and
adding the estimate of the second inter-block interference to the data block.

19. The method of claim 18, wherein the estimate of the second inter-block interference is generated according to:

$$d_l^{ibi} = (1-\alpha) \cdot \left( y_{N+l} - \sum_{m=0}^{M} t_{l-m} \cdot \hat{p}_m^b \right) + \alpha \sum_{m=0}^{M} \hat{x}_{l+N-m} \cdot \hat{p}_m^c \quad l = 0 \ldots (M-1).$$

20. A receiver, comprising:
a buffer operable to a store a signal including a data block having a first inter-block-interference and a training block having a second inter-block-interference; and
one or more modules operable to generate an estimate of the first inter-block-interference, to subtract the estimate of the first inter-block-interference from the data block, and to reconstruct the data block to include the second inter-block-interference.

21. The receiver of claim 20, wherein said one or more modules generate an estimation of the first inter-block-interference according to:

$$t_l^{ibi} = \sum_{m=0}^{M} t_{l+v-m} \cdot \hat{p}_l^a \quad l = 0 \ldots (M-1).$$

22. A receiver, comprising:
a buffer operable to store a signal including a data block having a first inter-block-interference and a training block having a second inter-block-interference; and
one or more modules operable to reconstruct the data block to exclude the first inter-block-interference, to generate an estimate of the second inter-block-interference, and to add the estimate of the second inter-block-interference to the data block.

23. The receiver of claim 22, wherein said one or more modules generate an estimation of the second inter-block interference according to:

$$d_l^{ibi} = (1-\alpha) \cdot \left( y_{N+l} - \sum_{m=0}^{M} t_{l-m} \cdot \hat{p}_m^b \right) + \alpha \sum_{m=0}^{M} \hat{x}_{l+N-m} \cdot \hat{p}_m^c \quad l = 0 \ldots (M-1).$$

24. A method for facilitating a detection of data symbols within a received signal block, said method comprising:
applying frequency-domain equalization to the received signal;
transforming the equalized frequency-domain signal from the frequency domain to an equalized time domain signal;
removing a guard period from the equalized time-domain signal; and
transforming the equalized time-domain signal without the guard period from the time domain to the frequency domain.

25. A receiver, comprising:

a buffer operable to store a signal including a data block and a guard period; and one or more modules operable to apply frequency-domain equalization to the signal, to transform the equalized signal from the frequency domain to an equalized time-domain signal, to remove the guard period from the equalized time-domain signal, and to transform the equalized time-domain signal without the guard period from the time domain to the frequency domain.

26. A method for processing a signal including a data block having a first inter-block-interference and a training block having a second inter-block-interference, said method comprising:

generating an estimate of the first inter-block interference and the second inter-block interference;

detecting a plurality of symbols within the data block based upon the estimate of the first inter-block interference and the estimate of the second inter-block interference;

remodulating the detected symbols; and resynthesizing the estimate of the first inter-block interference and the estimate of the second inter-block interference based upon the remodulation of the detected symbols.

27. The method of claim 26, wherein the detecting a plurality of symbols within the data block is further based on the output of a channel decoder.

28. A receiver, comprising:

a buffer operable to store a signal including a data block and a guard period; and one or more modules operable to generate an estimate of the first inter-block interference and the second inter-block interference, to detect a plurality of symbols within the data block based upon the estimate of the first inter-block interference and the estimate of the second inter-block interference, to remodulate the detected symbols; and to resynthesize the estimate of the first inter-block interference and the estimate of the second inter-block interference based upon the remodulation of the detected symbols.

29. A method for creating a multicarrier signal having no cyclic extensions, the method comprising the steps of:

generating a plurality of multicarrier data blocks, each multicarrier data block having no cyclic extension;

generating a plurality of training sequences that are not copies of portions of the plurality of multicarrier data blocks;

extending each of the plurality of multicarrier data blocks by adding one of the plurality of training sequences to create the multicarrier signal.

30. The method of claim 29 wherein the step of extending each of the multicarrier data blocks comprises the step of extending the multicarrier data blocks by adding one of the plurality of training sequences as either a prefix, a postfix, or a combination of a prefix and a postfix.

31. The method of claim 29 wherein the step of generating the plurality of multicarrier data blocks each multicarrier data block having no cyclic extension, comprises the step of generating the multicarrier data stream comprising the plurality of multicarrier data blocks each multicarrier data block having no cyclic prefix.

32. The method of claim 29 wherein the step of generating the plurality of training sequences comprises the step of generating a single training sequence that is not a copy of a multicarrier data block.

33. A method for creating a multicarrier signal, the method comprising the steps of:

generating a plurality of multicarrier data blocks;

generating a training sequence, that is not a copy of a portion of the multicarrier data blocks;

extending a multicarrier data block by adding the training sequence to create the multicarrier signal, wherein there exists no cyclic extension between the data block and the training sequence.

34. The method of claim 33 wherein the step of extending the multicarrier data block comprises the stop of extending the multicarrier data block by adding the training sequence as either a prefix, a postfix, or a combination of a prefix and a postfix.

35. The method of claim 33 further comprising the step of:

extending a plurality of the multicarrier data blocks by adding the training sequence to each of the plurality of multicarrier data blocks to create the multicarrier signal, wherein there exists no cyclic extension between each of the plurality of the data blocks and the training sequence.

* * * * *